W. Coutie,
Water Wheel,
N° 22,783. Patented Feb. 1, 1859.
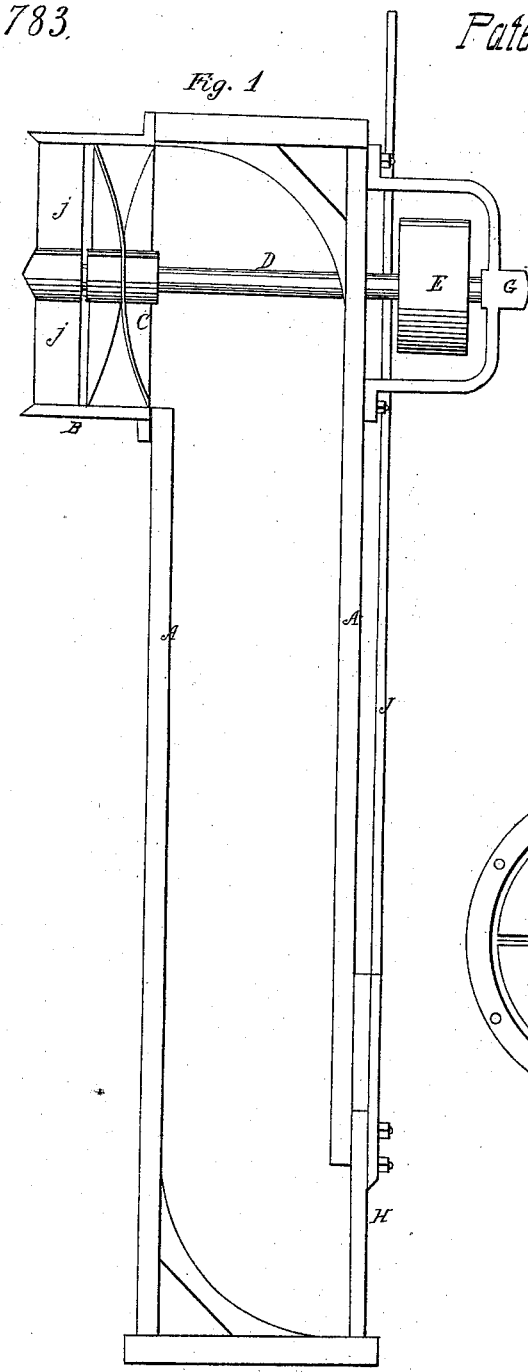
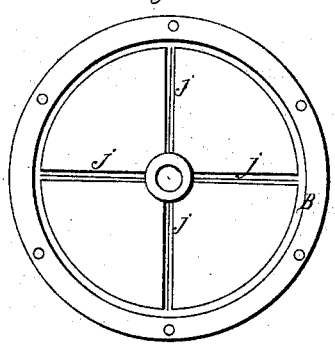
Witnesses:
Inventor:
William Coutie

UNITED STATES PATENT OFFICE.

WILLIAM COUTIE, OF TROY, NEW YORK.

IMPROVED WATER-WHEEL.

Specification forming part of Letters Patent No. 22,783, dated February 1, 1859.

*To all whom it may concern:*

Be it known that I, WILLIAM COUTIE, of the city of Troy, county of Rensselaer, in the State of New York, have invented new and useful Improvements in Water-Wheels; and I do hereby declare that the following is a full, clear, and exact description of the same, reference being had to the accompanying drawings, forming part of this specification, in which—

Figure 1 is an elevation of a wheel constructed according to my invention, the outer part of the flume being removed to show the working parts. Fig. 2 is a view of the front of the casing in which the wheel runs and shows the stationary plates which prevent the water from being rotated by the wheel.

This invention chiefly consists in the use and arrangement of certain stationary plates by which a rotary motion of the water is prevented and made to act with more effect on a screw-wheel; also in the arrangement of the wheel with the gate and suction-tube, the gate being placed at the bottom of the tube and behind the wheel, by which arrangement a more perfect draft is formed than when the gate is placed above the surface of the backwater, as it allows the tube to be perfectly filled with water, and so forms a perfect suction.

To enable others to make and use my invention, I will proceed to describe its construction and operation.

A A is the draft-tube.
B is the casing in which the wheel runs.

C is a double flange or propeller screw-wheel, made so as to revolve within the casing B. It is fixed on the shaft D, which runs in the hub in the center of the casing B and the step G and carries the power to the pulley E. The gate H is placed at the bottom of the draft-tube, below the surface of the backwater, so as to allow the tube to be filled with water from above through the wheel and to prevent the entrance of air from behind. It is opened and shut by the rod I, which may be carried to any convenient place for starting the wheel. The plates I are placed with edges to the water, directly in front of or behind the wheel. As the blades of the wheel stand obliquely to the water, it has a tendency to be thrown out of its course in a kind of rotary motion; but being kept in a straight course by the plates it presses with greater force on the wheel and gives out more power. Their number and dimensions will be proportioned according to the size of the wheel.

What I claim as my invention, and desire to secure by Letters Patent, is—

1. The stationary plate arranged as described, so as to prevent a rotary motion in the water when acting on a screw-wheel.
2. Placing the gate below the surface of the backwater in connection with the draft-tube, for the purposes specified.

WILLIAM COUTIE.

Witnesses:
GEO. P. PRESCOTT,
HARRY J. KING.